United States Patent [19]

Rodaway

[11] 4,338,830
[45] Jul. 13, 1982

[54] SUBTRACTIVE AND ADDITIVE DIFFERENTIAL GEAR REDUCTION SYSTEM

[76] Inventor: Keith S. Rodaway, 2636 28th St., Santa Monica, Calif. 90405

[21] Appl. No.: 295,861

[22] Filed: Aug. 24, 1981

Related U.S. Application Data

[62] Division of Ser. No. 90,669, Nov. 2, 1979, abandoned.

[51] Int. Cl.³ .................. F16H 57/10; F16H 1/28
[52] U.S. Cl. ............................. 74/764; 74/770; 74/805
[58] Field of Search .............. 74/764, 770, 785, 788, 74/789, 792, 804, 805

[56] References Cited

U.S. PATENT DOCUMENTS

| | | | |
|---|---|---|---|
| 1,673,863 | 6/1928 | Brown et al. | 74/770 |
| 1,833,648 | 11/1931 | Johnson | 74/805 |
| 2,200,890 | 5/1940 | Murray | 74/785 |
| 2,666,345 | 1/1954 | Amberg | 74/804 |
| 2,884,815 | 5/1959 | Pittman | 74/804 |
| 3,028,513 | 4/1962 | Sundt | 74/804 |
| 3,144,791 | 8/1964 | Menge | 74/804 |
| 3,217,564 | 11/1965 | Smith | 74/792 |
| 3,448,638 | 6/1969 | Zahlaus | 74/804 |
| 3,965,774 | 6/1976 | Omi et al. | 74/805 |
| 4,177,695 | 12/1979 | Grove | 74/804 |

FOREIGN PATENT DOCUMENTS

| | | | |
|---|---|---|---|
| 445973 | 4/1936 | United Kingdom | 74/770 |
| 588423 | 5/1947 | United Kingdom | 74/804 |

Primary Examiner—Lawrence J. Staab
Attorney, Agent, or Firm—Ralph B. Pastoriza

[57] ABSTRACT

The gear reduction system is of the differential type utilizing two ring gears with teeth on their inner circumference and first and second eccentric wheels having external teeth engaging the teeth on the ring gears as they roll about the inner circumference. The first and second wheels have their eccentricities mounted in an offset relationship so as to provide dynamic balancing during operation. By making the number of teeth on one of the eccentric wheels different from the number of teeth on the other, adding the second ring gear and providing appropriate pin carrier means coupled in a given arrangement, a very high gear reduction can be achieved in a single packaging. This gear reduction is equivalent to that heretofore only obtainable by ganging together separate reduction gear systems of this type.

1 Claim, 7 Drawing Figures

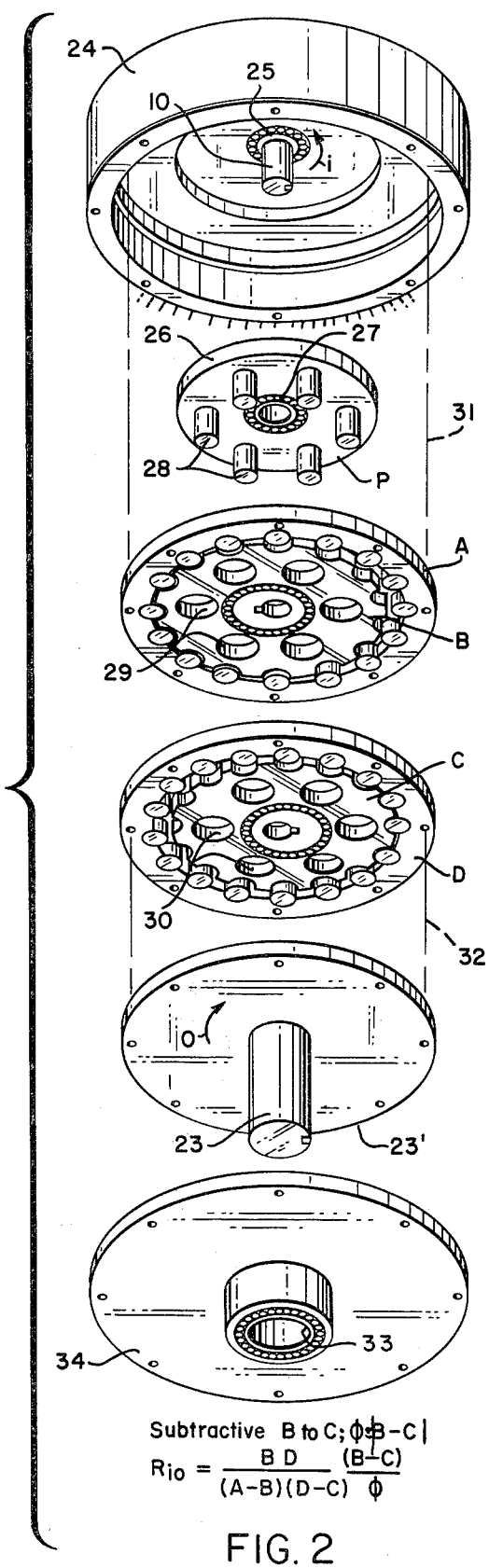
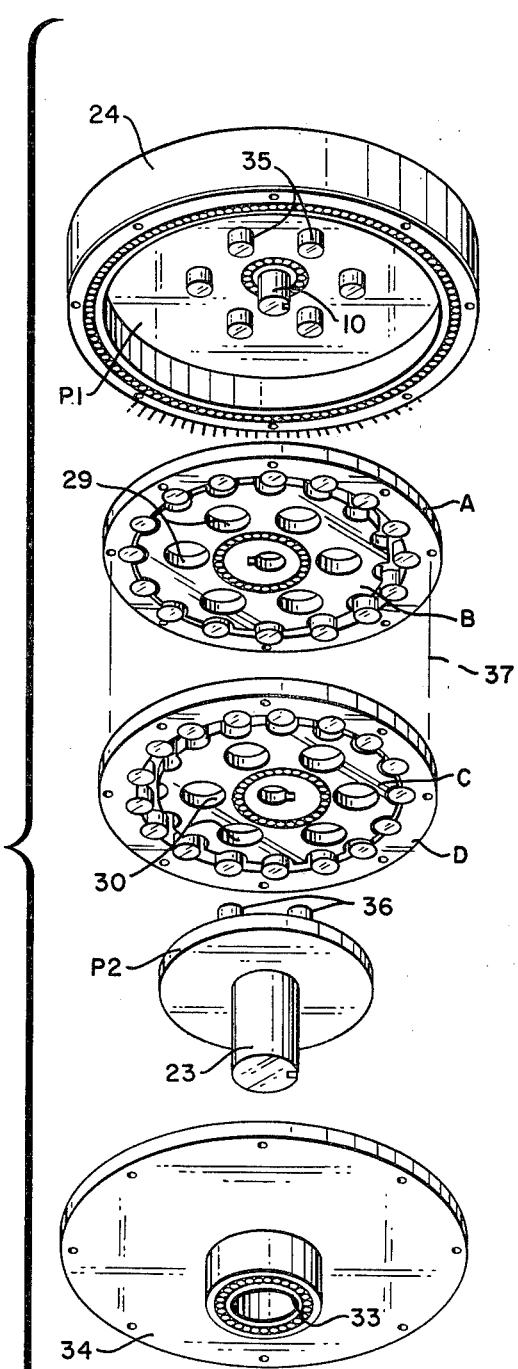
Subtractive B to C; $\phi = |B-C|$
$$R_{io} = \frac{BD}{(A-B)(D-C)} \frac{(B-C)}{\phi}$$
FIG. 2
Subtractive A to D; $\theta = |D-A|$
$$R_{io} = \frac{BC}{(A-B)(D-C)} \frac{(D-A)}{\theta}$$
FIG. 3

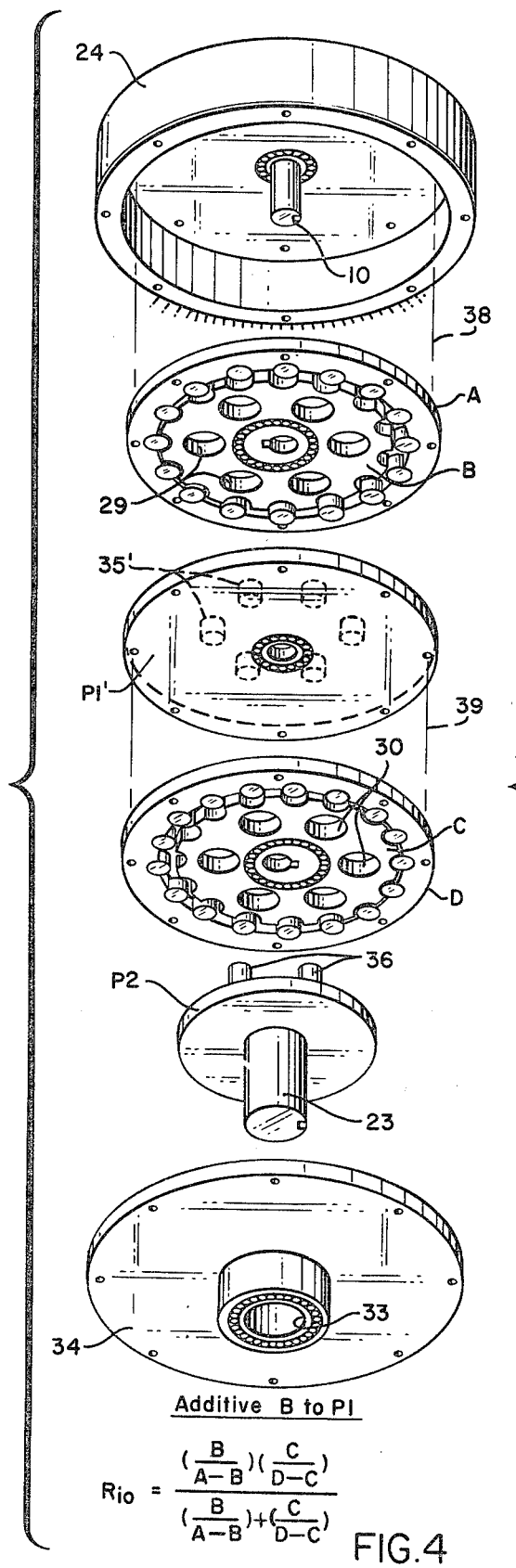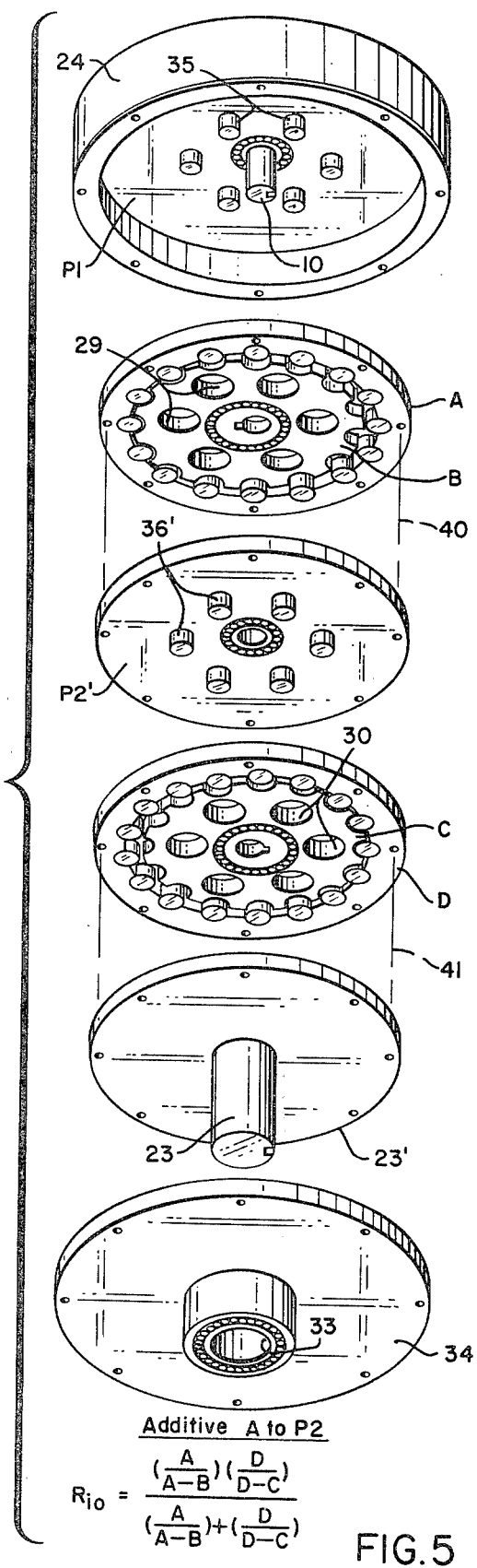
Additive B to P1
$$R_{io} = \frac{\left(\frac{B}{A-B}\right)\left(\frac{C}{D-C}\right)}{\left(\frac{B}{A-B}\right)+\left(\frac{C}{D-C}\right)}$$
FIG.4
Additive A to P2
$$R_{io} = \frac{\left(\frac{A}{A-B}\right)\left(\frac{D}{D-C}\right)}{\left(\frac{A}{A-B}\right)+\left(\frac{D}{D-C}\right)}$$
FIG.5

Reversing Clutch

V Engaged   W Free
$R_{io} = \frac{BC}{C-B} = 10$

V Free   W Engaged
$R_{io} = -C = -10$

Transmission Clutch

X Free   Y Free   Z Engaged
$R_{io} = E = 10$

X Free   Y Engaged   Z Free
$R_{io} = \frac{DE}{D+E} = 5$

X Engaged   Y Free   Z Free
$R_{io} = \frac{ADE}{A+D+E} = 2.917$

SUBTRACTIVE AND ADDITIVE DIFFERENTIAL GEAR REDUCTION SYSTEM

This application is a division of my copending application Ser. No. 090,669 filed Nov. 2, 1979 now abandoned.

This invention relates generally to gearing systems and more particularly to novel subtractive and additive differential gear reduction systems.

Speed reduction gears of the differential type having certain components in common with the reduction gears of the present invention are shown and described in U.S. Pat. No. 3,073,184. Further systems and refinements in such gearing arrangements are shown in U.S. Pat. Nos. 3,574,489; 3,668,947; 3,910,733; 3,998,112; and, 4,152,928. U.S. Pat. Nos. 4,031,781 deals specifically with the geometry of the gear teeth.

Basically, and typical of the above-noted prior art systems, is the provision of a ring gear having inner circumferential teeth cooperating with exterior teeth on an eccentrically mounted wheel of smaller diameter. The arrangement is such that the external teeth of the eccentric wheel rolls about the inner circumference of the ring gear. A speed reduction constituting a function of the number of teeth on the ring gear and the number of teeth on the eccentric wheel is provided from this basic system.

Since the eccentric wheel is eccentrically mounted, very rapid rotations of the input shaft would result in vibrations set up by dynamic forces developed as a consequence of the eccentric mounting of the eccentric wheel. These forces can effectively be cancelled by providing two eccentric wheels with their eccentricities offset such as to cancel out dynamic effects of the eccentricities. For example, where two eccentric wheels are provided, their eccentricities will be offset 180° from each other.

The foregoing gear reduction system can be coupled to drive an output shaft by means of a pin carrier element coupled to the eccentric wheels so as to rotate about the same axis as the input shaft axis notwithstanding that the eccentric wheels are eccentrically mounted.

In order to increase the ratio of speed reduction, the normal procedure has been to simply gang two of the foregoing types of differential gearing systems together along a common axis; that is, the output shaft of one will drive the input shaft of a next system.

Bearing the foregoing in mind, I have discovered that an equivalent high reduction ratio to that of ganging two prior art types of differential gear reduction systems together can be achieved in a single packaging without appreciably increasing the number of components involved and without sacrificing the beneficial effects of dynamic balancing of the eccentric wheels.

More particularly, the gear reduction system of this invention in its broadest aspects contemplates the provision of an input shaft together with a first ring having teeth on its inner circumference. A first eccentric wheel having teeth on its outer circumference engaging the teeth of the first ring has a first center bearing with a first eccentric shaft receiving opening receiving the input shaft and also having first pin receiving openings equally radially spaced from the first center bearing. A second eccentric wheel has teeth and a center bearing and a second eccentric shaft receiving opening receiving said input shaft and having second pin receiving openings equally radially spaced from the second center bearing. This second eccentric wheel has its eccentricity offset from the eccentricity of the first eccentric wheel to provide for dynamic balancing of the wheels when eccentrically moved by the input shaft.

A second ring having teeth on its inner circumference is provided for successively engaging the teeth on the exterior of the second eccentric wheel when the same is rolling about the inner circumference of the second ring. The pin carrier means cooperate with the first and second pin receiving openings of the first and second wheels. The assembly is completed by an output shaft and appropriate means interconnecting selected ones of the first and second eccentric wheels, first and second rings, pin carrier means and output shaft in a given arrangement such that a desired ratio of the number of input shaft rotations to the number of output shaft rotations is provided.

The various given arrangements can be such as to provide subtractive or additive systems or reversing clutch systems and even transmission systems.

Where high gear reduction is desired, the same can be provided in a single packaging without sacrificing proper dynamic balancing.

Since the present invention has to do with various combinations of eccentric wheels, rings and pin carriers, the specific gear tooth form such as plano-centric or planetary-eccentric can be used or the specifically designed teeth such as set forth in U.S. Pat. No. 4,031,781 can be used. For illustrative purposes only, these latter type teeth will be shown and described, but it is to be understood that the present invention is not limited to such tooth form. In fact, since the number of teeth is proportional to the wheel or ring diameter carrying the teeth, gear teeth as such could be eliminated and rolling friction relied upon in providing the various gear ratios.

In view of the foregoing, while the word "teeth" has been used and a number assigned defining the number of such "teeth" in this specification and claims, it is to be understood that such "teeth" could take any form and where virtually an infinite number of teeth were provided, the equivalent rolling engagement would result. The number of teeth in this latter situation would then be directly proportional to the wheel or ring diameter, and the expression "having a given number of teeth" would be equivalent to saying "having a given diameter or a diameter of a given number of measurement units". In other words, the desired gear reductions or other interactions between the components will provide the same desired results independent of tooth form or even in the absence of teeth if there is sufficient rolling friction to prevent slippage.

A better understanding of this invention will be had by now referring to the accompanying drawings in which:

FIG. 2 is an exploded perspective view of various components of a first subtractive system in accord with the present invention;

FIG. 3 is another exploded view of various components of the gear reduction system of this invention showing another subtractive embodiment thereof;

FIG. 4 is an exploded perspective view of various components illustrating an additive system in accord with the present invention;

FIG. 5 is another perspective, exploded view of various components illustrating another additive system in accord with the present invention;

Figure 1:
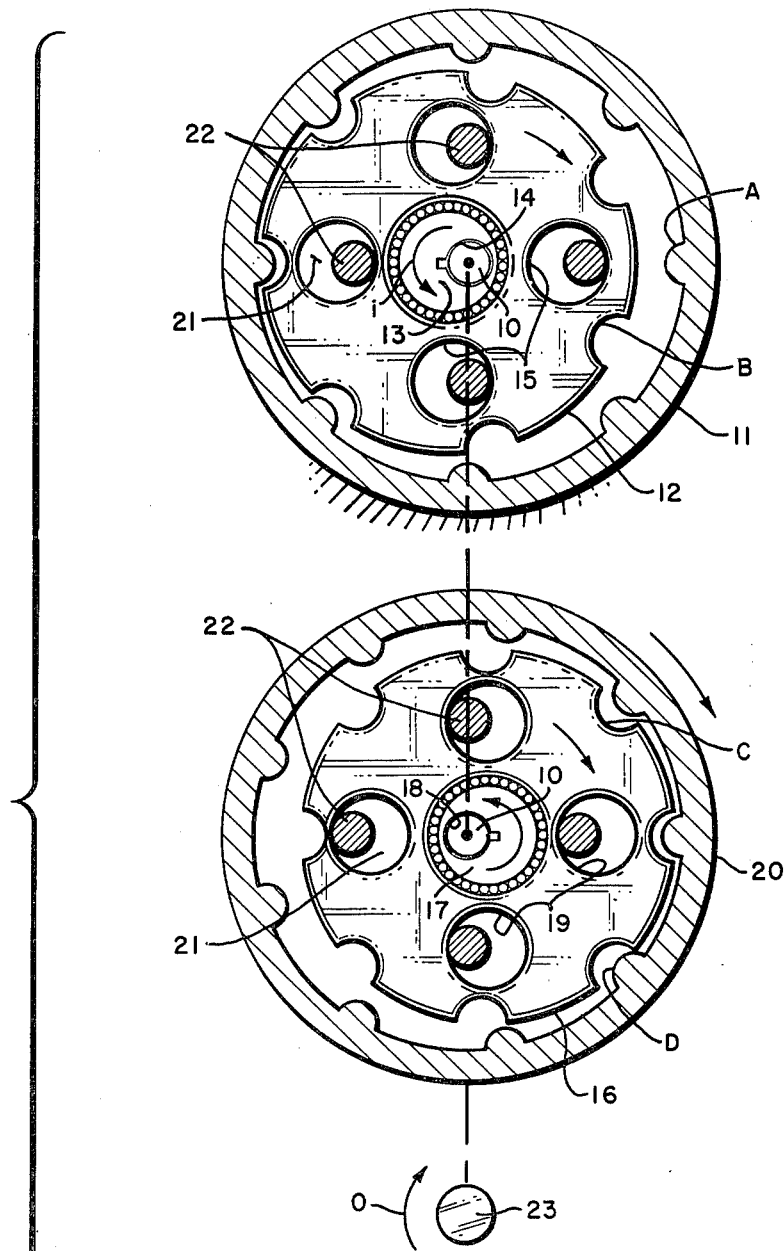
FIG. 1 is a diagramatic cross section of the basic components of the present invention in extremely simplified form useful in describing the operation together with appropriate formulas for the particular configuration illustrated.

Referring first to FIG. 1, the basic components making up the differential gear reduction system of this invention include an input shaft 10. A first ring 11 has a number of teeth on its inner circumference. These teeth may be of the form shown by the teachings of the heretofore referred to U.S. Pat. No. 4,031,781 and for purposes of illustration, eight such teeth are shown. Throughout the present specification, the first ring in the various embodiments will have a number of teeth designated by the letter A, it being understood that the total number of teeth on the first ring will normally be far greater than eight teeth.

A first eccentric wheel is shown at 12 provided with a first center bearing 13 with a first eccentric shaft receiving keyed opening 14 receiving the input shaft 10 as shown. The dimensioning of the eccentric wheel 12 is such that it will roll about the interior of the fixed ring gear 11 when the shaft 10 is rotated, the eccentric mounting of the center bearing 13 being such as to cause the desired movement of the eccentric wheel 12. In this respect, the exterior circumference of the wheel 12 is provided with a given number of teeth shaped in accord with the teachings of the heretofore referred to U.S. Pat. No. 4,031,781 which, in the example shown, constitute seven in number.

The letter B will hereafter be utilized to denote the number of teeth on the first eccentric wheel cooperating with the first ring.

The first eccentric wheel 12 further includes first pin receiving openings designated 15 equally radially spaced about the first center bearing 13 as shown.

Referring now to the structure below the first ring 11 and first eccentric wheel 12, there is shown a second eccentric wheel 16 having a second center bearing 17 with a second eccentric shaft receiving opening 18 receiving the same input shaft 10, it being understood that the second eccentric shaft receiving opening 18 would be coaxial with the first center bearing shaft receiving opening 14 for the first eccentric wheel 12. However, it will be noted that the second eccentric wheel 16 has its eccentricity offset from the eccentricity of the first eccentric wheel 12 to provide for dynamic balancing of the wheels when eccentrically moved by the input shaft 10.

As in the case of the first eccentric wheel, the second eccentric wheel 16 also includes second pin receiving openings 19 equally radially spaced about the second center bearing 17 as shown.

A second ring 20 having teeth on its inner circumference surrounds the second eccentric wheel 16 in a position coaxial with the input shaft 10 such that the second eccentric wheel 16 will roll about the inner circumference of the second ring 20. The number of teeth on the second eccentric wheel 16 is hereafter designated by the letter C and in the example set forth is eight.

The number of teeth on the second ring 20 will hereafter be designated by the letter D and in the example set forth is equal to nine.

The particular example shown in FIG. 1 further includes a pin carrier means comprising a pin carrier shown at 21 visible through the pin receiving openings 15 in the first eccentric wheel 12. Pin carrier 21 surrounds the input shaft 10 and has four projecting pins 22 received through overlapping portions of the pin receiving openings 15 and 19 in the first and second eccentric wheels 12 and 16 respectively. With this arrangement, the pins 22 essentially hold the first and second eccentric wheels 12 and 16 for rotation together in the same direction but permit offset eccentric movements thereof to take place.

The example of FIG. 1 is completed by the provision of an output shaft 23 arranged to be rotated by the second ring 20 as indicated by the dashed line in FIG. 1.

The lower case letter i represents the number of turns of the input shaft 10 and designates a rotational arrow in FIG. 1. The number of rotations of the output shaft 23 is indicated by the lower case letter o indicated by the correspondingly designated arrow for the output in FIG. 1.

If $R_{ib}$ represents the ratio of the number of input turns to the number of rotations or turns of the first eccentric wheel 12, the formula is:

$$R_{ib} = \frac{B}{A - B}$$

which in turn will equal seven.

If $R_{co}$ represents the ratio of the number of rotations of the second eccentric wheel 16 to the number of rotations of the output shaft 23, then:

$$R_{co} = \frac{D}{D - C}$$

that in turn equals nine.

Because of the coupling together of the first and second eccentric wheels by the pins 22 of the pin carrier, a final rotation is imparted to the second ring 20 by the second eccentric wheel 16 so that if $R_{io}$ is the ratio of the input shaft turns to the output shaft turns, the output shaft being connected to the second ring 20 as described heretofore, then:

$$R_{io} = \frac{B}{A - B} \cdot \frac{D}{D - C}.$$

It is desirable that a positive value for $R_{io}$ result when the rotations of the output shaft are in the same direction as the input shaft and that a negative value for $R_{io}$ result when the output shaft rotations are in a direction opposite to the input shaft rotations.

The foregoing proper sign depends upon whether the number of teeth B is greater than or less than the number of teeth C.

Let $\phi = |B\text{-}C|$. The ratio $R_{io}$ can then be expressed as follows:

$$R_{io} = \frac{BD(B - C)}{(A - B)(D - C)\phi}$$

which equals $-63$.

The negative result indicates that the output shaft 23 will rotate in an opposite direction from the input shaft, all as indicated by the arrows i and o, respectively.

That the foregoing formulas properly express the relationships for the simplified example of $A = 8$, $B = 7$, C=8, and D=9 can readily be verified by simple visualization of the drawings of FIG. 1. In actual practice, a far higher number of teeth would be employed as will now be illustrated in the subsequent figures.

Considering first FIG. 2, there is an arrangement of rings and eccentric wheels together with appropriate pin carrier means for providing a large gear reduction in accord with the principles described in FIG. 1. As a matter of convenience in describing the various embodiments of the present invention, the letters A, B, C and D will be utilized to designate the first ring, first eccentric wheel, second eccentric wheel, and second ring respectively. These letters can also conveniently stand for the number of teeth on each of these components.

Considering now in detail the specific embodiment shown in FIG. 2, starting at the upper portion of the drawing, there is again shown the input shaft 10 coaxially passing within a stationary casing 24 and rotatably supported by bearing 25 in the casing. The particular pin means heretofore briefly described in FIG. 1 is designated by the letter P and in the embodiment of FIG. 2 includes a pin carrier 26 supported by bearing 27 to the shaft 10 and provided with forwardly extending pins 28.

Shown below the pin carrier means P in FIG. 2 is the first ring A with the first eccentric wheel B mounted therein wherein the pin receiving openings for the first eccentric wheel B are designated 29 for receiving the pins 28.

Spaced below the first ring and first eccentric wheel is the second eccentric wheel C and second ring D, the second eccentric wheel having pin receiving openings 30 arranged to overlap the openings 29. The offset eccentricities of the first and second eccentric wheels B and C will be evident in FIG. 2 to provide for dynamic balancing. Where two such eccentric wheels are involved, the offset will be 180°.

The output shaft 23 is carried on a disc member 23' as shown.

Depending upon the desired value for $R_{io}$, means are provided for interconnecting selected ones of the first and second eccentric wheels, first and second rings, pin carrier means and output shaft in a given arrangement. In FIG. 2, the given arrangement corresponds to that depicted in FIG. 1 wherein the pin carrier means P comprises a single pin carrier 26 with pins 28 passing through the openings 29 and 30 of the first and second eccentric wheels when the openings are overlapping so that the eccentric wheels B and C are coupled to rotate together eccentrically about the input shaft. Further, the interconnecting means includes means for holding the first ring stationary, these means being indicated by the dashed lines 31 tying the circumference of the first ring A to the stationary casing 24. Further, the second ring D in turn is secured to the disc portion 23' of the output shaft 23 as indicated by the dashed-dot lines 32 so that the output shaft 23 rotates with the second ring D.

As illustrated in FIG. 2, a bearing for the output shaft may be provided at 33 held within a structure 34 securable to the casing 24 all as indicated.

With the foregoing arrangement, the same formula for defining the ratio of the number of input shaft rotations to the number of output shaft rotations obtains as that set forth in FIG. 1, to wit:

$$R_{io} = \frac{BD(B-C)}{(A-B)(D-C)\phi}$$

As an example of the foregoing, if A=16, B=15, C=16, and D=17, then $R_{io}$ will equal −255.

As mentioned heretofore, the minus sign indicates that the output shaft rotation is in an opposite sense to the input shaft rotation.

It is to be appreciated that this farily high gear reduction is achieved in a single package wherein only two eccentric wheels are provided to result in the necessary and desirable dynamic balancing the same as in the prior art structures and wherein the only difference is that one of the eccentric wheels has a different number of teeth from the other and there is provided a second ring member. Heretofore, as mentioned previously to obtain such a high gear reduction, it was necessary to gang together two of the prior art described gear reducers.

Referring now to FIG. 3, there is shown a modified type of subtractive gear reducer in accord with the present invention wherein a different given arrangement is provided for interconnecting the various parts to result in a different ratio of input to output rotations. In FIG. 3, corresponding parts described in FIG. 2 are designated by the same numerals. Basically, the only difference is in the pin carrier means and in the manner in which the components are coupled together.

More particularly, and with specific reference to FIG. 3, it will be noted that the pin carrier means includes a first pin carrier P1 shown within the stationary casing 24 surrounding the shaft 10 and provided with first pins 35. In the embodiment of FIG. 3, the pin means also includes a second pin carrier P2 to which the output shaft 23 is coaxially secured. The second pin carrier P2 has second pins 36. The given arrangement of the components in FIG. 3 is such that the first pins 35 extend forwardly only a sufficient distance to be received in the first pin receiving openings 29 of the first eccentric wheel B to hold this first eccentric wheel from rotating back and forth beyond its eccentric movements as said input shaft rotates.

Similarly, the second pin means extend only a sufficient distance to pass into the second pin receiving openings 30 of the second eccentric wheel C to couple the output shaft to said second eccentric wheel for rotation therewith.

Finally, the first ring A is connected to the second ring D to rotate the same therewith. The resulting ratio $R_{io}$ for this arrangement is set forth in the lower portion of FIG. 3 as follows:

$$R_{io} = \frac{BC(D-A)}{(A-B)(D-C)\theta}$$

where in this instance, $\theta$ is equal to $|D-A|$.

The expression $$\frac{(D-A)}{\theta}$$

provides the proper sign for the equation.

As in the case of the embodiment of FIG. 2, a gear reduction of large magnitude is again attained in a single packaging. It should be noted in both the FIG. 2 and FIG. 3 embodiments, that the large gear reduction attained in the single packaging does not involve making the packaging of any greater axial length even though a second ring gear is utilized. The first and second ring gears are actually half the thicknesses of the single ring gear cooperating with first and second 180° offset eccentric wheels in the prior art structures. Since two eccentric wheels are required for dynamic balancing, the prior art structures must necessarily have a given axial thickness. In the instant invention embodiments, two eccentric wheels are also used as described but have a different number of teeth and what was heretofore a single ring gear has been divided into two ring gears having different numbers of teeth for cooperation respectively with the first and second eccentric wheels.

The same situation obtains where the pin means comprise first and second pin carriers as in the embodiment of FIG. 3. For example, in the embodiment of FIG. 3, the extent of the pins is only half the extent of the pins 28 for the pin carrier P of FIG. 2 so that again, there is no increase in the overall axial extent of the packaging.

Referring now to FIG. 4, there is shown an additive gear reduction system wherein again similar numerals and letters have been used to designate corresponding parts heretofore described. In FIG. 4, however, the pin carrier means includes a first pin carrier P1' having first pins 35', and a second pin carrier P2 having second pins 36, the second pin carrier P2 being secured to the output shaft 23. In this respect, the second pin carrier P2 and output shaft 23 arrangement together with the pins 36 is the same as that described in FIG. 3.

The given arrangement of the components in the embodiment of FIG. 4 is such that the first pins 35' pass into the first pin receiving openings 29 of the first eccentric wheel B so that the first pin carrier P1' is rotated by the first eccentric wheel B. The second pins 36, in turn, pass into the second pin receiving openings 30 of the second eccentric wheel C so that the output shaft 23 is effectively rotated by the second eccentric wheel C. Finally, the first ring A is held stationary as indicated by the dash-dot lines 38 to the stationary casing 24 and the first pin carrier P1' is connected to the second ring D as indicated by the dash-dot lines 39.

The resulting ratio $R_{io}$ is as shown in FIG. 4 and is reproduced as follows:

$$R_{io} = \frac{\left(\frac{A}{A-B}\right)\left(\frac{C}{D-C}\right)}{\left(\frac{B}{A-B}\right)+\left(\frac{C}{D-C}\right)}$$

In this additive system, B may be the same as C. FIG. 5 shows another embodiment of an additive system wherein the pin carrier means includes a first pin carrier P1 having first pins 35 which first pin carrier and first pins are secured to the stationary casing 34 and in this respect are the same as the pin carrier P1 and pins 35 described in the embodiment of FIG. 3. Also provided is a second pin carrier P2' having second pins 36'. The given arrangement for the embodiment of FIG. 5 is that the first pins 35 pass into the first pin receiving openings 29 to hold the first eccentric wheel B from rotating back and forth beyond its eccentric limits as the input shaft rotates.

The second pins 36', in turn, pass into the second pin receiving openings 30 so that the second eccentric wheel C is coupled to and rotatable with the second pin carrier P2'.

Finally, the first ring A is connected to the second pin carrier P2' as indicated by the dash-dot lines 40 and the second ring D is connected to the output shaft flange structure 23' as indicated by the dash-dot lines 41 to rotate with the output shaft.

For the embodiment of FIG. 5, the ratio $R_{io}$ is as shown and is reproduced as follows:

$$R_{io} = \frac{\left(\frac{A}{A-B}\right)\left(\frac{D}{D-C}\right)}{\left(\frac{A}{A-B}\right)+\left(\frac{D}{D-C}\right)}$$

where again, B may equal C.

Figure 6:
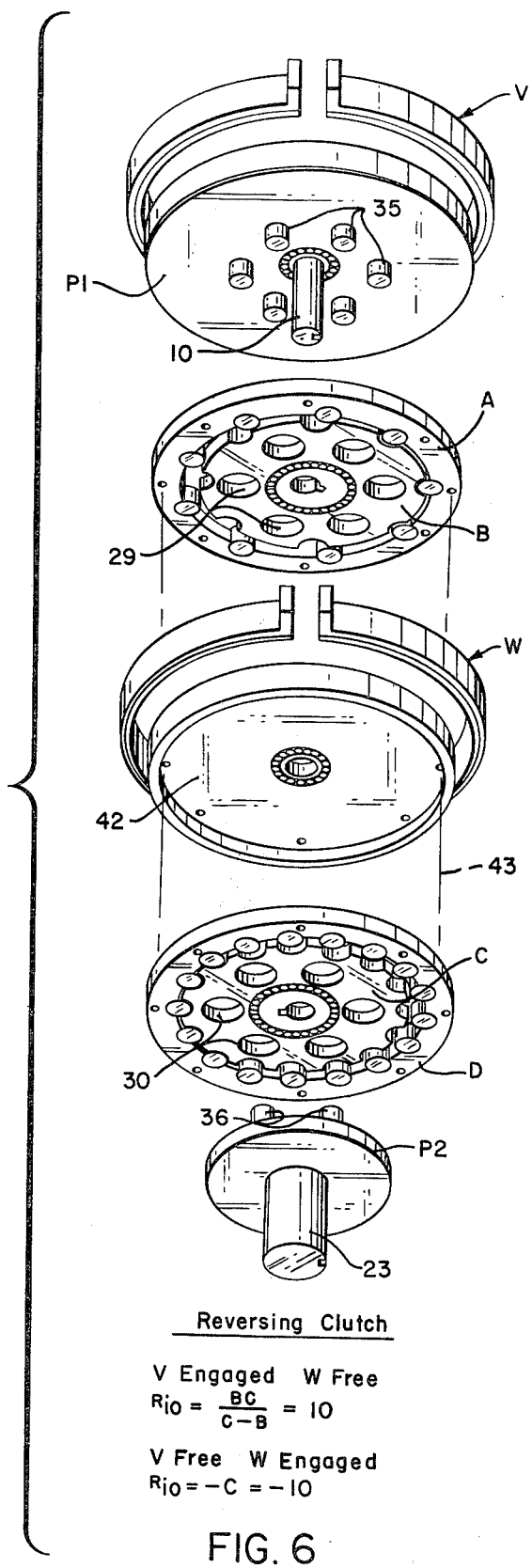
FIG. 6 is an exploded perspective view highly schematic in form illustrating a reversing clutch in accord with the principles of the present invention.

Referring now to FIG. 6, there is illustrated various components arranged in accord with the present invention to provide a reverse clutch. In this respect, the components already described in previous drawings are designated, again, by the same numerals and letters and in the specific embodiment set forth, these components are arranged essentially the same as those described in FIG. 3 with the addition of appropriate brake means.

Referring to the upper portion of FIG. 6, the pin carrier includes a first pin carrier P1 having first pins 35. This pin carrier has a circular edge constituting a braking surface for braking by a first brake band V. A second pin carrier P2 is shown in the lower portion of FIG. 6 and has second pins 36 and is also connected directly to the output shaft 23 the same as described in FIG. 3. A central brake disc 42 is provided to which both the first ring A and the second ring D are secured as indicated by the dashed lines 43. Disc brake 42 has an exterior edge arranged to be braked by a second brake band W.

Thus, the specific given arrangement of the components for the FIG. 6 embodiment is such that the first pins 35 pass into the first pin receiving openings 29 so that the first pin carrier and first eccentric wheel B are coupled for rotation together. The second pins 36, in turn, pass into the second pin receiving openings 30 so that the output shaft is rotated by the second eccentric wheel C. As already mentioned, the first and second rings A and D are effectively secured together by way of the brake disc 42 so that they will rotate together.

With the foregoing arrangement, and provided that A-B equals one and D-C equals one, the ratio $R_{io}$ when the first brake V is engaged and the second brake W is disengaged is given by:

$$R_{io} = \frac{BC}{C-B}.$$

When the first brake V is disengaged and the second brake C is engaged, then $$R_{io} = -C.$$

From the foregoing, because of the different sign for the two equations, it will be seen that a reversing clutch system is provided. If C=2B the same reduction is effected in both a forward and reverse direction.

Figure 7:
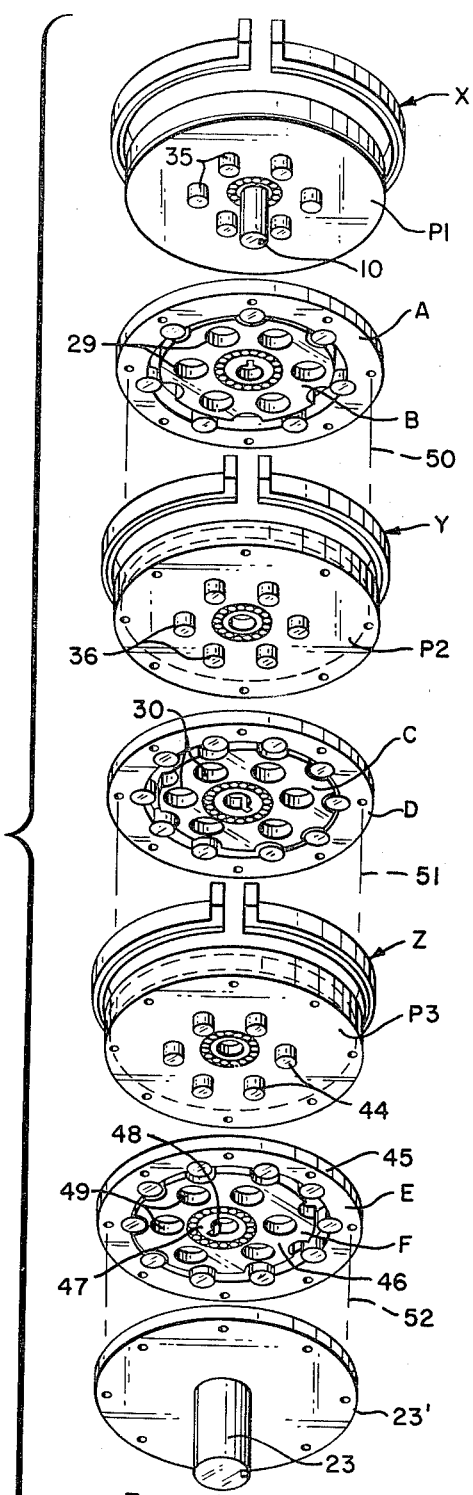
FIG. 7 is an exploded perspective view of various components used in making up a transmission clutch utilizing the principles of the present invention.

Referring now to FIG. 7, there is shown an arrangement of the various components described together with additional components to provide a transmission clutch. In this embodiment, the pin carrier means includes a first pin carrier P1 having first pins 35 similar to the structure of FIG. 6. A second pin carrier P2, in turn, has second pins 36 and a third pin carrier P3 is provided with pins 44. In addition, there is provided a third ring 45 having E teeth on its inner circumference and a third eccentric wheel 46 having F teeth. The third eccentric wheel further has a third center bearing 47 with a third eccentric shaft receiving opening 48 offset with respect to the first and second eccentric shaft receiving openings in the first and second eccentric wheel center bearings to provide for dynamic balancing of all three of the eccentric wheels when eccentrically moved by the input shaft 10. The eccentric offset in this arrangement would be 120° rather than 180° for the three eccentric wheels to provide for proper dynamic balancing. As in the case for the first and second eccentric wheels, the third eccentric wheel 46 includes third pin receiving openings 49.

In the embodiment of FIG. 7, the given arrangement of the components shown is such that the first pins 35 are received in the first pin receiving openings 29, the second pins 36 are received in the second pin receiving openings 30, and the third pins 44 are received in the third pin receiving openings 49. Further, the first ring A is connected to the second pin carrier P2 as indicated by the dashed lines 50, the second ring B is connected to the third pin carrier P3 as indicated by the dash-dot lines 51 and the third ring 45 is connected to the disc 23' secured to the output shaft 23 so as to be effectively connected to the output shaft, all as indicated by the dash-dot lines 52.

First, second and third brake bands X, Y and Z respectively, in turn, are positioned to engage and disengage the first, second, and third pin carriers P1, P2 and P3.

With the foregoing arrangement, and assuming that the number of teeth on each of the first, second and third eccentric wheels is one less than the corresponding number of teeth on the associated first, second and third rings, the following situation obtains:

When the third brake band Z is engaged and the first and second brake bands X and Y are free, $$R_{io} = E.$$

When the second brake band Y is engaged and the first and third brake bands X and Z are free, $$R_{io} 32 \frac{DE}{D + E}.$$

When the first brake band X is engaged and the second and third brake bands Y and Z are free, $$R_{io} = \frac{ADE}{A + D + E}$$

A variable speed transmission is thus provided.

From all of the foregoing examples, it will be evident that the present invention has provided greatly improved subtractive and additive differential gear reduction systems.

In actual practice, and as mentioned heretofore, the number of teeth on the various eccentric wheels and rings would be far greater than those illustrated in the drawings or chosen for numerical examples, merely for illustrative purposes. Thus, it can be appreciated that very high gear reduction ratios can be achieved in a single packaging of the components all as described and still with the maintenance of proper dynamic balancing when the input shaft is rotated at high speeds.

I claim:
1. A gear reduction system including, in combination:
(a) an input shaft;
(b) a first ring having A teeth on its inner circumference;
(c) a first eccentric wheel having B teeth for successively engaging said A teeth when rolling around said inner circumference, said first eccentric wheel having a first center bearing with a first eccentric shaft receiving opening receiving said input shaft and having first pin receiving openings equally radially spaced from said first center bearing;
(d) a second eccentric wheel having C teeth and a second center bearing with a second eccentric shaft receiving opening receiving said input shaft and having second pin receiving openings equally radially spaced from said second center bearing, said second eccentric wheel having its eccentricity offset from the eccentricity of said first eccentric wheel to provide for dynamic balancing of the wheels when eccentrically moved by said input shaft;
(e) a second ring having D teeth on its inner circumference for successively engaging said C teeth when said second eccentric wheel is rolling around said inner circumference of said second ring;
(f) pin carrier means cooperating with said first and second pin receiving openings of said first and second eccentric wheels;
(g) an output shaft; and
(h) means interconnecting selected one of said first and second eccentric wheels, first and second rings, said pin carrier means and said output shaft in a given arrangement such that a desired ratio $R_{io}$ of the number of input shaft rotations to the number of output shaft rotations is provided, $R_{io}$ being negative if the output shaft rotations are in a direction opposite to the input shaft rotations and positive if the output shaft rotations are in the same direction as the input shaft rotations, said pin carrier means including a first pin carrier having first pins, a second pin carrier having second pins, and a third pin carrier having third pins, there being provided a third ring having E teeth on its inner circumference, and a third eccentric wheel having F teeth and a third center bearing with a third eccentric shaft receiving opening off-set with respect to said first and second eccentric shaft receiving openings to provide for dynamic balancing of all three of the eccentric wheels when eccentrically moved by said input shaft, said given arrangement being such that when said first pins are received in said first pin receiving opening, said second pins are received in said second pin receiving openings, and said third pins are received in said third pin receiving openings; and wherein said first ring is connected to said second pin carrier, said second ring is connected to said third pin carrier, and said third ring is connected to said output shaft; first, second, and third brake bands positioned respectively to engage and disengage said first, second and third pin carriers so that when said third brake band is engaged and said first and second brake bands are free and A—B=1, D—C=-1, E—F=1;

$$R_{io} = E;$$

and when said second brake band is engaged and said first and third brake bands are free $$R_{io} = \frac{DE}{E + D};$$

and when said first brake band is engaged and said second and third brake bands are free $$R_{io} = \frac{ADE}{A + D + E}$$

whereby a variable speed transmission system is provided.

* * * * *